July 23, 1968 G. J. NORMAN 3,394,363

DIFFERENTIAL RELUCTANCE SHAFT ANGLE TRANSDUCER

Filed Nov. 12, 1965 2 Sheets-Sheet 1

INVENTOR.
GEORGE J. NORMAN.
BY
ATTY.

July 23, 1968          G. J. NORMAN          3,394,363

DIFFERENTIAL RELUCTANCE SHAFT ANGLE TRANSDUCER

Filed Nov. 12, 1965          2 Sheets-Sheet 2

INVENTOR.
GEORGE J. NORMAN
BY *Hodges*
ATTY.

United States Patent Office 3,394,363
Patented July 23, 1968

3,394,363
DIFFERENTIAL RELUCTANCE SHAFT ANGLE TRANSDUCER
George J. Norman, Garrett Park, Md., assignor to the United States of America as represented by the Secretary of the Navy
Filed Nov. 12, 1965, Ser. No. 507,588
8 Claims. (Cl. 340—196)

ABSTRACT OF THE DISCLOSURE

A shaft angle measurement transducer comprises two electrically energized wire coils mounted in a ferromagnetic casing and a rotor unit having two separated ferromagnetic armature segments fastened to a nonmagnetic sleeve which fits and rotates within the casing. The rotor is fastened to the shaft whose angular rotation is to be measured. As the shaft turns the armature segments change the relative magnetic coupling between the two coils giving an indication of the degree of angular rotation.

---

The invention described herein may be manufactured and used by or for the Government of the United States of America for governmental purposes without the payment of any royalties thereon or therefor.

This invention relates to electrical transducers and more particularly to such a system for use in indicating the angular position of a shaft.

In applications employing rotating shafts such as control surface shafts or ship's rudder drives it is oftentimes necessary to have an accurate indication of the angular position of the shaft for purposes of monitoring and control.

Formerly, the angular position of such shafts were measured and indicated by means of potentiometers, selsyns and shaft digitizers connected to the shaft by means of gears or belts. One major disadvantage of such systems is the backlash or lost motion between the shaft and transducer giving rise to errors. A further disadvantage is the difficulty in waterproofing such devices for submerged operation. In addition such prior systems frequently necessitated physical alteration of the shaft so that the transducer could be connected thereto.

Accordingly, it is an object of this invention to provide an improved shaft angle transducer for indicating the angular displacement of any shaft.

A further object of this invention is to provide a shaft angle transducer which is completely free from any backlash or lost motion.

A still further object is to provide a device of the character described which is easily waterproofed for submerged operation.

Another object is to provide a device for indicating the angular displacement of any size shaft which can be mounted directly on the shaft without physical alteration and at any position thereon and which requires no sliding contacts, brushes, gears or belts.

Another object of the invention is to provide a shaft angle indicating means in which the output is a linear function of the angular rotation.

Other objects and advantages will become apparent from the following description taken in connection with the accompanying drawings in which.

Briefly stated, the invention comprises a cylindrical shell made of ferromagnetic material within which two wire wound bobbins are mounted. A rotor unit consists of two separated slotted cylindrical armature segments made of ferromagnetic material fastened to the outside of a non-magnetic cylindrical sleeve which fits and rotates within the cylindrical shell. The sleeve fastened to the armature segments is attached around the shaft whose angular displacement is to be measured while the cylindrical shell is held firm as a reference. The bobbins are energized with sources of alternating current thus setting up a magnetic field in the vicinity of each coil of wire.

In operation, a relative angular displacement between the armature and shell changes the relative magnetic coupling of the two wire wound bobbins which change may be detected and measured by a suitable indicating instrument as a measure of rotation of the shaft.

Figure 1:
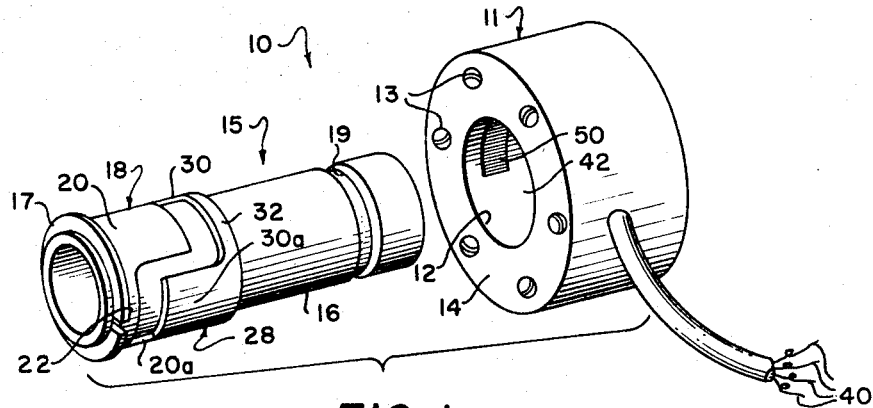
FIG. 1 is an exploded view of the shaft angle transducer showing the overall construction.

Referring now to the drawings for a fuller description, FIG. 1 illustrates the shaft angle transducer 10 adapted to be mounted on a shaft. The transducer 10 comprises a cylindrical housing 11 having a bore 12 therethrough and a rotor assembly 15 which is mounted around the shaft whose angular displacement is to be measured. The shaft and rotor assembly 15 fit within bore 12 of the housing 11 which, preferably, is held firmly to a support to prevent rotation as the shaft and attached rotor assembly 15 rotate. Rotor assembly 15 includes a sleeve 16 formed of non-magnetic material, preferably a non-metal. Attached to the sleeve 16 are two armature segments 18 and 28 made of any suitable ferromagnetic material, such as mu metal. Armature segment 18 consists of a ring portion 22 completely surrounding sleeve 16 and two tabs 20, 20a, connected to ring 22, and which face each other. Similarly, armature segment 28 consists of ring portion 32 and tabs 30, 30a. The tabs extend along sleeve 16 and in the preferred embodiment extend slightly less than 90° over the periphery of sleeve 16. In the assembly armature segment 28 is rotated a quarter of a turn around the axis of sleeve 16 with respect to armature segment 18 and inserted thereon such that tabs 30, 30a fit within the spaces between tabs 20, 20a.

Figure 2:
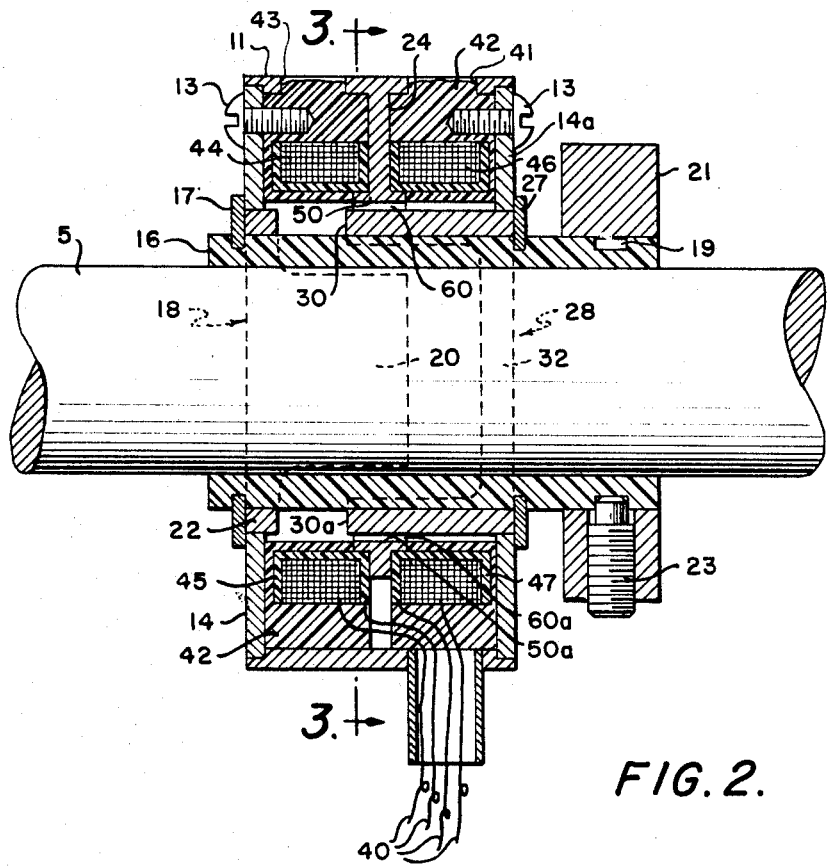
FIG. 2 is a sectional view of the shaft angle transducer placed in position around a shaft whose angular displacement is to be measured.
Figure 3:
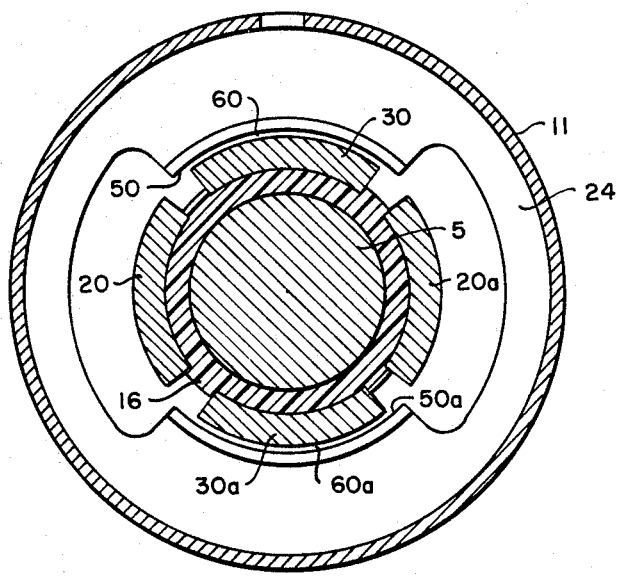
FIG. 3 is a view along section line 3—3 of FIG. 2.

Referring now to FIG. 2 which is a cross-sectional view of the transducer 10 in position around a shaft 5 whose angular displacement is to be measured, rotor 15 is secured to the housing 11 by means of retaining rings 17 and 18 inserted into grooves in sleeve 16. Thus rotor 15 is free to rotate along with shaft 5 but is prevented from transverse motion by means of rings 17 and 27. In the preferred embodiment, housing 11 is held firmly while shaft 5 and rotor 15 rotates freely. Sleeve 16 is attached to shaft 5 by any suitable means such as by means of a clamping ring 21 having screws 23 tightened against bottom of groove 19 or by cementing or bonding. Included within housing 11 are two annular wire coils 44, 46 wound around bobbins 45, 47 constructed of any suitable non-magnetic material, preferably a non-metal. The wires are brought out of the housing for connection to suitable instrumentation, hereinafter described, by means of cable 40. After placement within housing 11 the bobbins are held in place and waterproofed by a suitable potting compound 42 which is introduced through holes 41 and 43 in the top of housing 11. Potting compound 42 also serves to hold screws 13, which fasten side pieces 14 and 14a to housing 11. Each bobbin is separated by a collar 24 which may be made part of housing 11 and preferably constructed of the same ferromagnetic material. The innermost edges of collar 24 are formed into two oppositely disposed flange-shaped pole pieces 50, 50a. The portions of collar 24 between pole pieces 50, 50a are partially cut away so that the magnetic fields surrounding coils 44 and 46 are mutually coupled. In addition, some coupling occurs as a result of fringing at the ends of the pole pieces; however this effect is negligible and does not affect linearity within the angular range within which the transducer is employed which is about 60°. Referring now to FIG. 3 each of the pole pieces 50, 50a extend, preferably over a 90° angle viewed from a direction parallel to the shaft. The pole pieces 50, 50a extend slightly over the edges of the tabs when shaft 5 is oriented as shown in FIG. 3. However, the number of pole pieces as well as the number of tabs on the armature segment may be varied to suit particular applications. Additionally, the angular extent of the pole pieces and tabs around the shaft periphery may be selected as a matter of choice. In the preferred embodiment, the rotor 15, which is connected to shaft 5, fits within bore 12 of housing 11. The cross-sectional diameter of the rotor 15 including sleeve 16 and armature segments 18 and 28 is dimensioned so that it fits closely within the diametrical space between pole faces 50 and 52a forming an air gap 60, 60a between each pole face and tab. Thus, in FIG. 3 showing one possible orientation between rotor 15 and collar 24 an air gap 60 exists between tab 30 and pole face 50 and an air gap 60a exists between tab 30a and pole face 50a. Pole faces 50 and 50a are centered directly over the midpoint between armature segments 18, 28.

In operation, coils 44 and 46 are energized with an alternating current usually of power frequency such as 60 or 400 c.p.s. The alternating current in the coils establishes a magnetic field in their vicinity. The magnetic field causes magnetic flux $\phi$ to flow in the magnetic circuit formed by side pieces 14, 14a of housing 11, collar 24, air gaps 60, 60a and armature segments 18, 28 through tabs 20, 20a and 30, 30a, respectively. As an example, FIG. 2 shows one possible orientation of armature segments and pole pieces. As coils 44 and 46 are energized, magnetic flux flows in the magnetic circuit including side piece 14a across the top of housing 11 down collar 24 to pole face 50 across air gap 60 to tap 30 and back to side piece 14a. Referring now to FIG. 3 it can be seen that as shaft 5 and rotor 16 rotate the area of each tab "seen" by the pole faces across the air gap will change. Thus, FIG. 3 shows a maximum of magnetic contact or coupling between pole face 50 and tab 30 across air gap 60 while no magnetic contact (disregarding fringing effects) between either pole face 50 and 50a and tab 20 and 20a.

It may be shown according to magnetic circuit theory that the amount of flux $\phi$ flowing through a hypothetical idealized magnetic circuit having an air gap having a length 1 and an area A equal to the area of the faces of the gap poles is given by $$\phi = \frac{ni\mu_0 A}{l + \frac{L}{\mu}}$$

where:

$n$ equals the number of turns of the coil;
$i$ equals the amount of current flowing through the coil;
$L$ equals the inductance of the coil;
$l$ equals the mean length of the air gap;
$A$ equals the mean cross-sectional area of the air gap;
$\mu$, $\mu_0$ equal the permeability of the magnetic material and of free space, respectively.

Thus, flux $\phi$ is directly and linearly proportional to the cross-sectional area A of the air gap.

As shaft 5 and rotor 16 rotate, the amount of flux will change as a linear function of the rotation since the cross-sectional area of the air gap is changed accordingly. It can also be seen that with such rotation the relative magnetic coupling between the two coils 44, 46 is changed in the following manner: considering FIG. 3 again, as shaft 5 rotates in a counterclockwise direction, there will be less flux flowing between pole face 50 and tab 30 and more flux flowing between pole face 50 and tab 20a. Similarly, less flux will flow between pole face 50a and tab 30a and more flux will flow between pole face 50a and tab 20a. Because of the unique arrangement of the armature segments 18, 28 on the shaft a change in flux flowing between, say, pole face 50 and tab 20a will change the coupling of associated coil 44 and coil 46.

Figure 4:
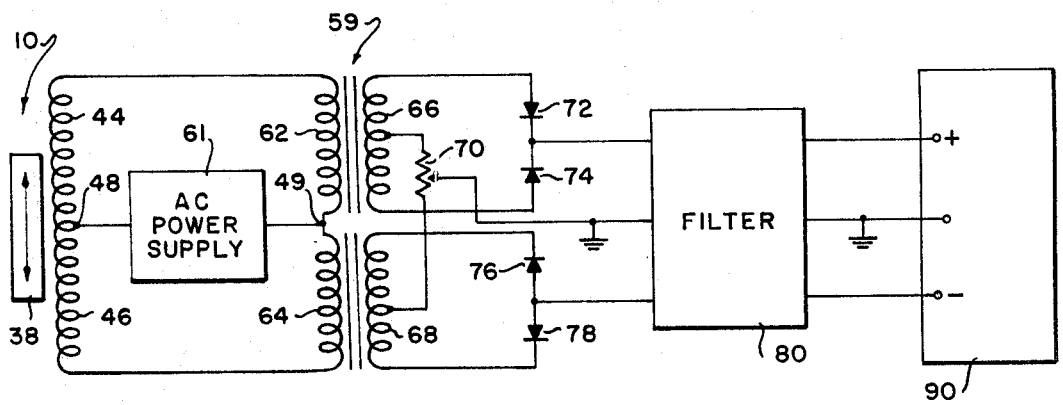
FIG. 4 is a schematic showing the detecting and indicating circuit used with the shaft angle transducer.

The change in relative magnetic coupling through the differential reluctance feature between coils 44 and 46 may be detected and indicated by means of instrumentation shown in FIG. 4 which illustrates the shaft angle transducer 10 connected to the instrumentation circuitry.

One end of coils 44 and 46 are connected together in series at point 48. The variation of the flux in the actual embodiment of the transducer 10 is produced by a variable relationship between the pole faces and armature segments, the means to effect this variation is represented schematically by element 38. An alternating current power supply 61, preferably of power line frequency, such as 60 or 400 c.p.s., is connected on one side to point 48 and causes the magnetic field-producing current to flow in coils 44 and 46. The other side of A.C. power supply 61 is connected to the primary side of transformer 59 at point 49. Transformer 59 contains a primary winding comprising coils 62 and 64 connected together in series at point 49 and secondary windings 66 and 68 which are bridged together through balancing resistor 70. Coils 44 and 46 are connected to the primary windings 62 and 64 of transformer 59, respectively. Secondary winding 66 is connected to two oppositely poled diodes 72, 74 in series. Similarly, secondary winding 68 is connected to oppositely poled diodes 76, 78 in series. A lead is connected to the cathodes of diodes 72 and 74 and connected to filter 80. Another lead is connected to the anodes of diodes 76 and 78 and connected to filter 80. Resistor 70 is tapped off so that a null or balance may be achieved and the tap is grounded. Filter 80 is a smoothing filter of the series-R shunt-C type to reduce ripple voltages. The output of filter 80 is fed to any suitable indicating instrument 90 such as a pen recorder or differential voltmeter.

In operation, coils 44 and 46 are energized by means of A.C. power supply 61. The relative magnetic coupling between the coils is varied as heretofore described as a function of the shaft rotation causing the current amplitude flowing into the primary windings 62 and 64 of transformer 59 to vary. This change is reflected in the secondary windings 66, 68 of transformer 59 and fed to oppositely poled diodes 72, 74 and 76, 78 which serve to rectify the secondary A.C. current. RC filter 80 smoothes out the ripples of the rectified current and the resulting change in D.C. current is fed to an indicator 90 which measures its amplitude. As pointed out the amplitude is directly and linearly proportional to the amount of angular displacement of the shaft.

In practice, the transducer is employed to measure angular displacements within the range of ±30° or a total of 60°. Within this limit, the resulting output is a linear function of the angular rotation of the shaft. By suitable selection of the number of pole pieces and armature segment tabs as well as their angular extent about the shaft axis, the useful linear range of the device may be increased.

This invention is not limited to the specific details described herein but is to be measured solely by the scope of the appended claims.

What is claimed is:
1. A linear transducer for indicating angular displacement comprising:
first means for establishing a magnetic field;
second means having a constant spaced relation to said first means for varying the flux path of said magnetic field;
said second means being mounted concentrically of said first means; and sensing means for detecting the variation produced in the flux by said second means;

said variations being proportional to the angular displacement between said first and said second means;

said first means including a housing composed of ferromagnetic material and a plurality of wire-wound annular coils mounted therein;

said plurality of coils being separated by an annular ferromagnetic wall having oppositely disposed cutaway portions whereby magnetic fields from said coils may be coupled.

2. A linear transducer for indicating angular displacement as set forth in claim 1 wherein:

said housing has a bore therethrough and oppositely disposed poles are formed on said separating wall adjacent to said bore.

3. A linear transducer for indicating angular displacement as set forth in claim 2 wherein:

said plurality of coils comprises first and second coils; and said second means includes a rotor mounted within the bore of said housing;

said rotor comprising: a cylindrical sleeve composed of non-magnetic material; and first and second spaced segments composed of ferromagnetic material mounted on said sleeve.

4. A linear transducer for indicating angular displacement as set forth in claim 3 wherein:

said segments comprise: a ring encircling said sleeve and oppositely-faced spaced tabs connected to said ring and disposed along the axis of said sleeve at the periphery thereof.

5. A linear transducer for indicating angular displacement as set forth in claim 4 wherein:

said first and second segments are disposed such that the tabs of one of said segments fit within the spaces between the tabs of the other of said segments.

6. A linear transducer for indicating angular displacement as set forth in claim 5 including:

a variable reluctance magnetic circuit for carrying magnetic flux formed by said housing and said segments; the reluctance of said circuit being a function of the cross-sectional area of magnetic coupling between said tabs and said pole pieces; whereby relative angular displacement between said housing and said rotor causes a change in said cross-sectional area and a change in the magnetic coupling between said coils.

7. A linear transducer for indicating angular displacement as set forth in claim 6 including:

indicating means responsive to said sensing means for determining said change in magnetic coupling.

8. A linear transducer for indicating angular displacement as set forth in claim 6 wherein:

said magnetic circuit is energized by the action of an alternating current flowing through said coils.

References Cited
UNITED STATES PATENTS

| | | | |
|---|---|---|---|
| 2,564,018 | 8/1951 | Malmqvist et al. | 33—205 |
| 3,123,785 | 3/1964 | Moller | 336—135 |
| 3,172,092 | 3/1965 | Ledford et al. | 340—195 |
| 3,217,308 | 11/1965 | Maxwell | 340—196 |
| 3,273,096 | 9/1966 | Lipshutz | 336—30 |

MILTON O. HIRSHFIELD, *Primary Examiner.*

WARREN E. RAY, *Assistant Examiner.*